United States Patent
Katsuta et al.

[11] Patent Number: 5,885,624
[45] Date of Patent: Mar. 23, 1999

[54] APPARATUS FOR CONTROLLING INJECTION MOLDING MACHINES

[75] Inventors: Hiroshi Katsuta; Makoto Nishizawa, both of Shizuoka, Japan

[73] Assignee: Toshiba Machine, Co., Ltd., Tokyo, Japan

[21] Appl. No.: 877,326

[22] Filed: Jun. 17, 1997

[30] Foreign Application Priority Data

Jun. 17, 1996 [JP] Japan .................................... 8-155695

[51] Int. Cl.$^6$ .................................................. B29C 45/77
[52] U.S. Cl. ........................ 425/149; 425/150; 425/574
[58] Field of Search .................... 425/574, 149, 425/150, 151

[56] References Cited

U.S. PATENT DOCUMENTS 3,924,994 12/1975 Aoki ....................................... 425/574
4,808,355 2/1989 Kamiyama et al. .................... 425/574
5,460,505 10/1995 Ito et al. ................................. 425/151

*Primary Examiner*—Tim Heitbrink
*Attorney, Agent, or Firm*—Whitham, Curtis & Whitham

[57] ABSTRACT

An apparatus for a feed-back control of an injection molding machine, comprising a control target which operational conditions are different in accordance with operational purposes; and a control unit for subjecting said control target to a feed-back control, is characterized in that said control unit comprises a judgement function section for judging operational purposes of the control target, a condition setting section for setting operational conditions in accordance with the operational purposes and a switching section for switching the condition setting section through the judgement function section.

6 Claims, 2 Drawing Sheets

APPARATUS FOR CONTROLLING INJECTION MOLDING MACHINES

BACKGROUND OF THE INVENTION

The present invention relates to a feed-back controller for controlling injection molding machines, and more particularly to a feed back controller for controlling a control target which operational conditions are different in accordance with operational purposes.

Generally, an injection unit 10, as illustrated in FIG. 1, comprises an injection cylinder 16 driven by a discharge hydraulic pressure supplied through a switching valve 14 from a hydraulic pump 12 and an injection screw 18 moved within a barrel 18a in forward and backward directions by the injection cylinder 16. Under the control of the feed-back controller, the injection unit 10 is moved in the forward and backward directions by a driving apparatus which is not illustrated so that when an injection nozzle 20 as a top portion thereof touches with a mold 22 closed so as to inject a molten resin into the mold 22 for forming a molded article.

The above injection unit 10 including the switching valve 14 is controlled by a control unit 24. In this case, for the control target, for example, the injection screw 18, the operational state or position thereof are changed in accordance with operational purposes or the molding operation and the purge operation. In the purge operation, the injection unit 10 is positioned as retreated.

The operational state is automatically changed in accordance with the operational purposes for remarkable improvements in operational facilitation and safety of the injection molding machine.

The above control unit may, however, has the following problems to be solved.

In the conventional control unit, the injection screw 18 as the control target is controlled only in the operational states or the advanced and retreated positions so as to adjust the molding operation and the purge operation, but never controlled in motions such as the injection speed. Namely, under the conventional control of the injection unit 10, the injection speed remains unchanged between in the molding operation and the purge operation, although in the molding operation, the injection speed should be set higher than that in the purge operation. If, in the molding operation, the injection speed is lower than the required speed, this results in a low responsibility of the injection unit thereby to deteriorate the quality of the molded article. If, in the purge operation, the injection speed is higher than the required speed, this results in generation of a hunching phenomenon thereby raising the problem in safety.

In the above circumstances, it had been required to develop an apparatus for controlling positions, injection speed and injection pressure of the injection screw in the injection molding machine so as to adjust different operational conditions such as the molding operation and the purge operation.

SUMMARY OF THE INVENTION

Accordingly, it is an object of the present invention to provide an apparatus for controlling positions, injection speed and injection pressure of the injection screw in the injection molding machine so as to adjust different operational conditions such as the molding operation and the purge operation.

The above and other objects, features and advantages of the present invention will be apparent from the following descriptions.

In accordance with the present invention, an apparatus for a feedback control of an injection molding machine, comprising a control target which operational conditions are different in accordance with operational purposes; and a control unit for subjecting said control target to a feedback control, is characterized in that said control unit comprises a judgement function section for judging operational purposes of the control target, a condition setting section for setting operational conditions in accordance with the operational purposes and a switching section for switching the condition setting section through the judgement function section.

It is preferable that the control target is an injection screw, the control purposes are purge and real molding operations, a judging reference of the judgement function section is given by judging whether or not a mold is closed and an injection nozzle touches with the mold as well as the operational conditions of the condition setting section are an injection speed and an injection pressure of the injection screw.

In accordance with the present invention, operational conditions of the control target are different in accordance with the operational purposes. The operational conditions are optimally set to adjust the respective operational purposes by the condition setting section, the judgement section and the switching section, for which reason the operational purposes of the control target are completely achieved.

BRIEF DESCRIPTIONS OF THE DRAWINGS

A preferred embodiment of the present invention will be described in detail with reference to the accompanying drawings.

PREFERRED EMBODIMENT

Figure 1:
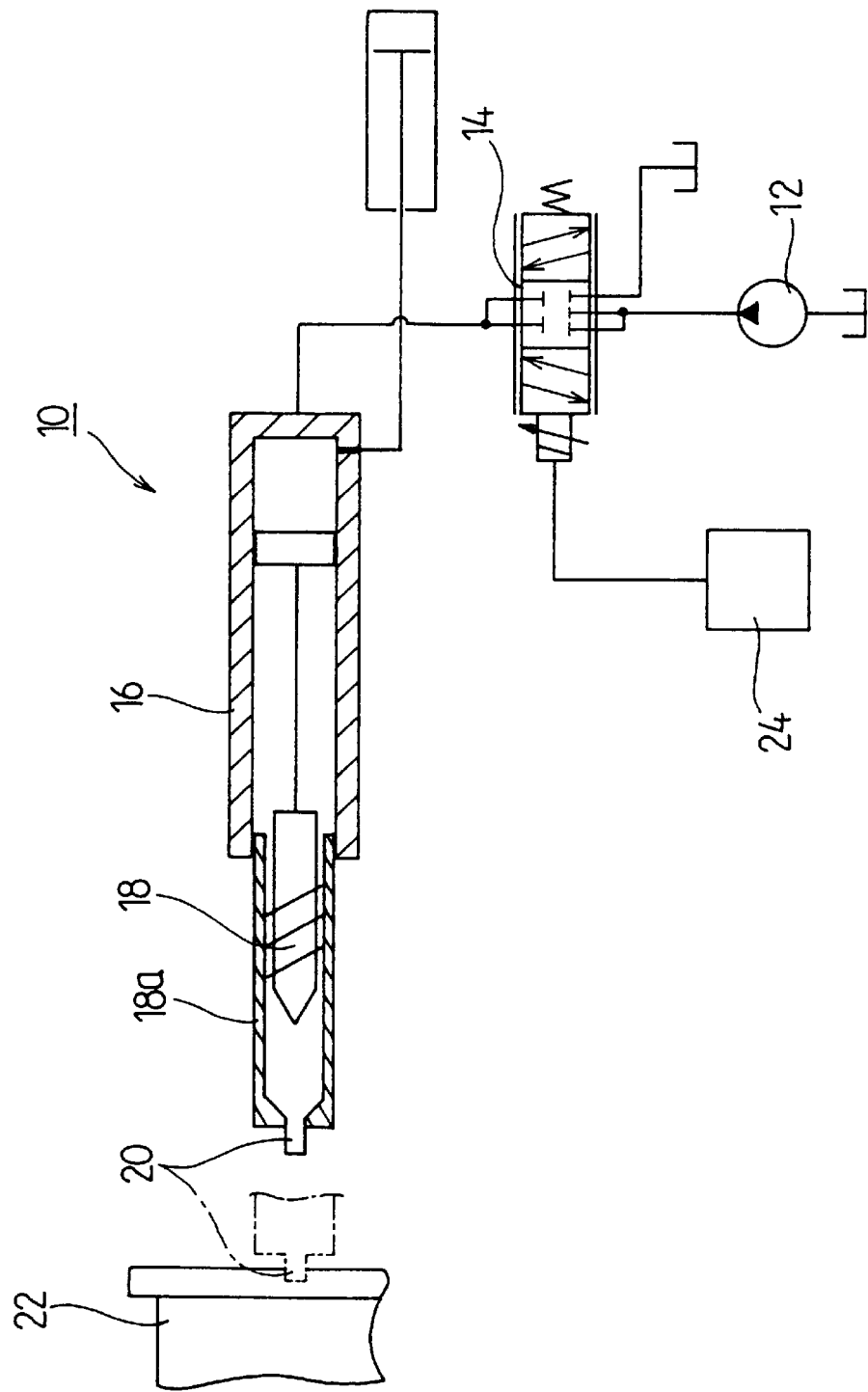
FIG. 1 is a schematic view illustrative of the injection molding machine controlled by the conventional controller.
Figure 2:
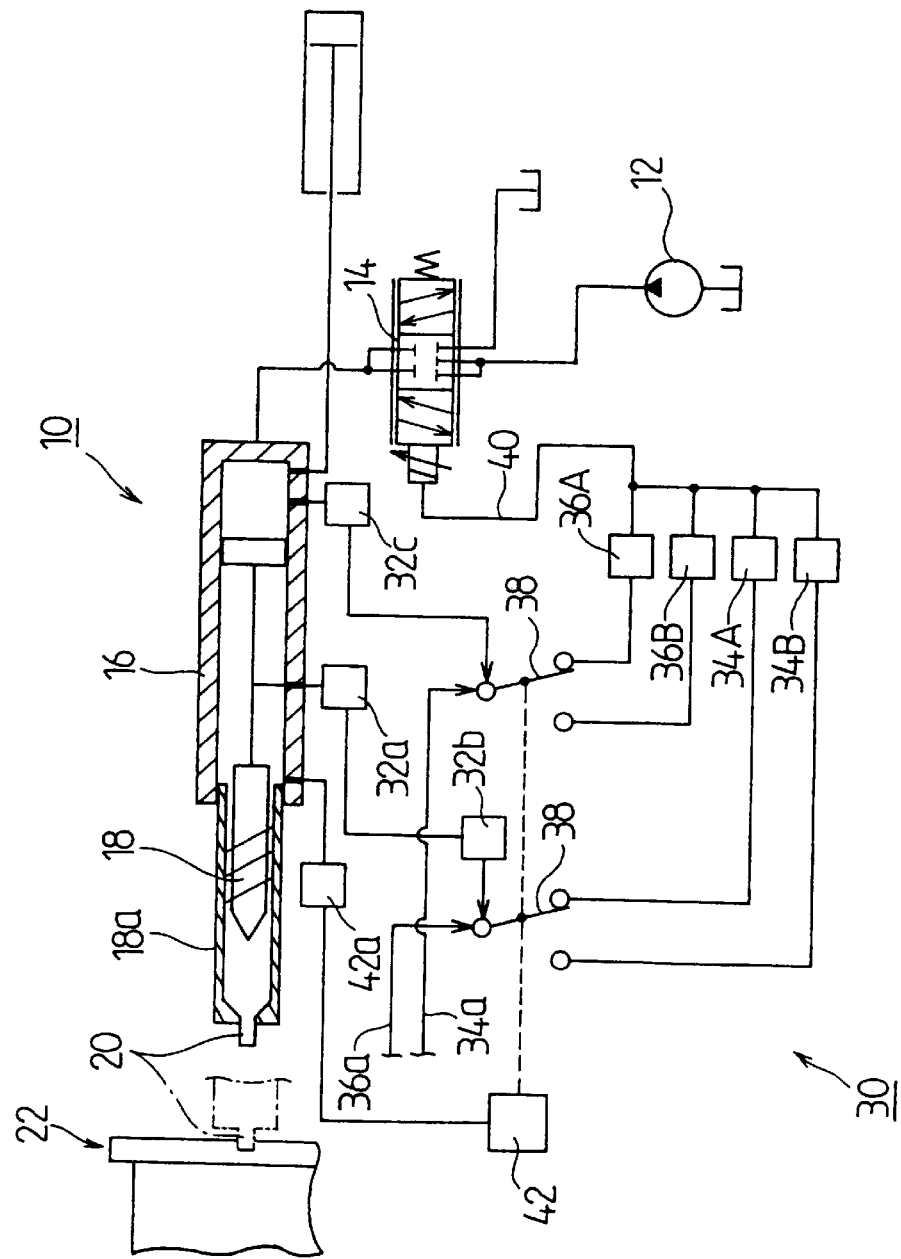
FIG. 2 is a schematic view illustrative of an injection molding machine controlled by a novel controller in a preferred embodiment according to the present invention.

A first embodiment according to the present invention will be described in detail with reference to FIG. 2. An injection unit 10 comprises an injection cylinder 16 driven by a discharge pressure supplied through a switching valve 14 from a hydraulic pump 12 and an injection screw 18 movable within a barrel 18a in forward and backward directions. The injection unit 10 is movable in the forward and backward directions by a driving apparatus which is not illustrated so that when a top injection nozzle 20 of the barrel 18a touches with a mold 22 closed so as to inject a molten resin into the mold 22 whereby a molded article is formed.

The above injection unit 10 is controlled by a control unit 30, so that a position of the injection screw 18 is different in a molding operation and in a purge operation. For example, in the purge operation, the injection unit 10 is positioned as retreated for improvements in facilitation and safety of the operations of the injection unit 10. The control unit 30 has a judging device for judging whether the injection screw 18 is performing the molding operation or the purge operation. The control unit 30 further has first and second injection speed setting devices 34A and 34B for setting injection speeds suitable for the molding operation or the purge operation respectively as well as first and second injection pressure setting devices 36A and 36B for setting injection pressures suitable for the molding operation or the purge operation respectively. The control unit 30 further more has switching devices 38 for switching between the first and second injection speed setting devices 34A and 34B and also switching between the first and second injection pressure setting devices 36A and 36B.

The judgement device 42 judges an operation purpose in accordance with a result of detection, by an injection unit position sensor 42a, of whether or not an injection nozzle 20 touches with a mold 22 closed. Settings of desired values to the first and second injection speed setting devices 34A and 34B and the first and second injection pressure setting devices 36A and 36B are made by a speed instruction means 34a and a pressure instruction means 36a. The control unit 30 performs a feed-back control to the switching valve 14 and the like so that the injection speed and pressure of the screw 18, which are detected by a screw position sensor 32a and a speed converter 32b as well as a pressure switch 32c respectively, correspond to values of control output signals or the desired values which are outputted from the first and second injection speed setting devices 34A and 34B and the first and second injection pressure setting devices 36A and 36B.

As described above, in accordance with the present invention, it is possible to change concurrently the settings of both the operational states, for example, forward and backward positions of the injection unit and the operational conditions, for example, injection speed and injection pressure of the screw in accordance with the operational purposes, for example, molding operation and purge operation. Namely, the setting of the operational condition of the screw is automatically changed to adjust either of the molding or purge operations. The quality of the molded article in the molding operation and the safety of the purge operation are improved as well as facilitation of the operations is also improved.

The above invention is, of course, applicable to not only the screw but also other control targets or two or more operational purposes and conditions.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims any modifications of the present invention which fall within the spirit and scope of the present invention.

What is claimed is:

1. An apparatus for a feed back control of an injection molding machine, comprising:
   a control led object obtaining various commands in accordance with movements of said control led object; and
   a control unit controlling the control led object by feed back control, wherein said control unit comprises:
      a decision function unit judging said movements of said control led object,
      a command setting unit setting commands in accordance with said movements, and
      a selection unit switching the command setting unit through the decision function,
   wherein the feedback control of the control unit adjusts at least one of an injection speed and an injection pressure which adjusts the movement of said control led object in order to control the injection molding machine.

2. The apparatus of claim 1, wherein:
   the control led object is an injection screw,
   the movements are purge and real molding operations,
   references of the decision function unit are a die close and an injection nozzle touch, and
   commands of the command setting unit are an injection speed and an injection pressure of the injection screw.

3. The apparatus of claim 1, wherein the judgement function receives a signal from an injection unit position sensor which detects a die close and an injection nozzle touch.

4. The apparatus of claim 1, wherein the control unit further comprises:
   a first injection speed setting and a second injection speed setting, the first and second injection speed settings set injection speeds for a molding operation and a purge operation; and
   a first injection pressure setting and a second injection pressure setting, the first and second injection pressure settings set injection pressures for a molding operation and a purge operation.

5. The apparatus of claim 4, wherein the selection unit further comprises a switching device that switches between (i) the first injection speed setting and the second injection speed setting and (ii) the first injection pressure setting and the second injection pressure setting.

6. A feed back control of an injection molding machine controlling operational settings of the injection molding machine in a purge mode and a molding mode, comprising:
   at least one injection speed setting device setting injection speeds depending on whether the injection molding machine is in one of the purge mode and the molding mode;
   at least one injection pressure setting device setting injection pressures depending on whether the injection molding machine is in one of the purge mode and the molding mode;
   a switch switching between the at least one injection speed setting device and the at least one injection pressure setting device;
   an injection unit position device sensing a die close and an injection nozzle touch; and
   a feed back control switching device switching one of the injection speeds and the injection pressures corresponding to control output signals of at least the at least one injection speed setting device, the at least one injection pressure setting device and the injection unit position device,
   wherein the injection speeds and the injection pressures are adjusted by feed back control based on whether the injection molding machine is in one of the purge mode and the molding mode.

* * * * *